United States Patent
Shin

(10) Patent No.: US 9,151,990 B2
(45) Date of Patent: Oct. 6, 2015

(54) LIQUID CRYSTAL DISPLAY DEVICE AND MANUFACTURING METHOD THEREOF

(75) Inventor: Dong Cheon Shin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1029 days.

(21) Appl. No.: 12/285,926

(22) Filed: Oct. 16, 2008

(65) Prior Publication Data

US 2009/0130343 A1 May 21, 2009

(30) Foreign Application Priority Data

Nov. 20, 2007 (KR) .................. 10-2007-0118234

(51) Int. Cl.
*C09K 19/00* (2006.01)
*G02F 1/1337* (2006.01)

(52) U.S. Cl.
CPC ............ *G02F 1/133788* (2013.01); *G02F 2001/133715* (2013.01); *G02F 2202/025* (2013.01); *Y10T 428/1005* (2015.01); *Y10T 428/1023* (2015.01)

(58) Field of Classification Search
CPC ............ Y10T 428/10; Y10T 428/1005; Y10T 428/1018; Y10T 428/1023; G01F 2202/025; G01F 1/133788; G01F 1/13378; G01F 1/133723; G01F 2001/133715; C08G 73/10; C08G 73/1046; C08G 73/124
USPC .......... 349/123, 139; 428/1.2, 1.1, 1.25, 1.26, 428/473.5; 528/170, 310; 427/508, 58
See application file for complete search history.

(56) References Cited

U.S. PATENT DOCUMENTS

| | | | |
|---|---|---|---|
| 5,306,505 A * | 4/1994 | Kuzuya et al. | 424/464 |
| 2002/0006681 A1* | 1/2002 | Yamanaka et al. | 438/29 |
| 2003/0064235 A1* | 4/2003 | Okawa et al. | 428/473.5 |
| 2005/0129859 A1* | 6/2005 | Misev et al. | 427/384 |
| 2006/0061719 A1* | 3/2006 | Tomioka et al. | 349/123 |
| 2006/0142538 A1* | 6/2006 | Tsutsui et al. | 528/310 |

FOREIGN PATENT DOCUMENTS

| | | |
|---|---|---|
| CN | 1707336 A | 12/2005 |
| CN | 1716004 A | 1/2006 |
| JP | 2000-187221 A | 7/2000 |
| KR | 10-1999-0008689 A | 2/1999 |
| KR | 10-2007-0087834 A | 8/2007 |

OTHER PUBLICATIONS

Korean Office Action dated Mar. 14, 2014 for corresponding Patent Application No. KR 10-2007-0118234.

* cited by examiner

*Primary Examiner* — Ruiyun Zhang
(74) *Attorney, Agent, or Firm* — Morgan, Lewis & Bockius LLP

(57) ABSTRACT

An LCD device adapted to improve a residual image matter is disclosed. The LCD device includes an alignment layer aligning the liquid crystal. The alignment layer is formed of an optically aligned composition inclusive of an aromatic compound. Also, the alignment layer undergoes a crosslinking process. In accordance therewith, the thermalization of the alignment layer is improved. As a result, the residual image problem of the LCD device can be solved.

3 Claims, 3 Drawing Sheets

LIQUID CRYSTAL DISPLAY DEVICE AND MANUFACTURING METHOD THEREOF

CROSS-REFERENCE TO RELATED APPLICATION

This application claims priority under 35 U.S.C. 119 to Korean Patent Application No. 10-2007-118234, filed on Nov. 20, 2007, which is hereby incorporated by reference in its entirety.

BACKGROUND

1. Field of the Disclosure

This disclosure relates to a liquid crystal display device, and particularly to a liquid crystal display device including an alignment layer of thermal stability, and a manufacturing method thereof.

2. Description of the Related Art

Nowadays, liquid crystal display (LCD) devices have been highlighted as one of next-generation high-tech display devices, because of their features such as less consumption power, superior portability, techno-intensiveness, high added value and so on. The LCD device includes a liquid crystal panel for displaying an image depending on the light transmittance, and a backlight for providing light to the liquid crystal panel. The liquid crystal panel includes a lower substrate having a TFT (Thin Film Transistor) and a pixel electrode, an upper substrate having a black matrix and a color filter and arranged to face the lower substrate, and a liquid crystal layer interposed between the two substrates.

The characteristics of the liquid crystal panel, for example, light transmissivity, viewing angle, and contrast, are closely related to the alignment characteristic of liquid crystal. Accordingly, to align liquid crystal in a particular direction on the liquid crystal panel, an alignment layer is formed on a substrate before the liquid crystal is formed. To form the alignment layer, a rubbing process, in which a rubbing cloth makes physical contact with the substrate on which an alignment material is formed, is widely used. The rubbing process may generate static electricity that can damage the TFT formed on the substrate and contaminate the surface of the alignment layer.

To solve the problem in the rubbing process, a liquid crystal alignment method in a non-contact manner has been researched. The non-contact type method may be a light irradiation method that includes a photoisomerization method, a photodegradation method, and a photopolymerization method.

Of the methods, the photodegradation method is to align liquid crystal by generating optical anisotropy using a photodegradation reaction, that is, a partial combination of molecules is selectively cut in a particular direction by irradiating light to an organic substance including a light alignment material. In the photodegradation method, since the molecular weight of the organic substance included in the alignment layer decreases as the alignment layer is formed while the organic substance is decomposed itself, the thermal characteristic of the alignment layer may be deteriorated. Accordingly, when thermal stress is applied to the alignment layer, the alignment force of the alignment layer is deteriorated so that the alignment of the liquid crystal may be deformed. As a result, it is more control the liquid crystal alignment and a residual image, that is, brightness of a particular area of the alignment layer to which the thermal stress is applied may abnormally increase.

BRIEF SUMMARY

Accordingly, the embodiments the present disclosure are directed to an LCD device and a manufacturing method thereof that substantially obviate one or more of problems due to the limitations and disadvantages of the related art.

An object of the embodiment of the present disclosure is to provide an LCD device that can solve the thermalization and residual image problems, and a manufacturing method thereof.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the embodiment of the present disclosure, an LCD device includes: a first substrate; a second substrate disposed to face the first substrate; a liquid crystal layer interposed between the first and second substrates; and an alignment layer disposed on an inner surface of at least one of the first and second substrates and formed of a chemical composition indicated by Chemical Formula 1,

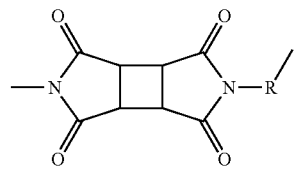

[Chemical Formula 1]

wherein "R" is an aromatic based chemical compound. For example, the aromatic based chemical compound includes on of substances represented in any one of Chemical Formula 2 to 6 described below.

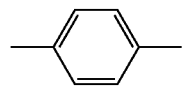

[Chemical Formula 2]

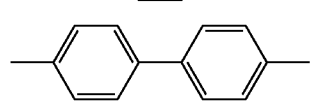

[Chemical Formula 3]

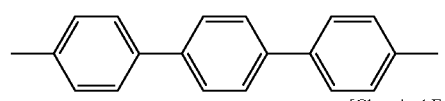

[Chemical Formula 4]

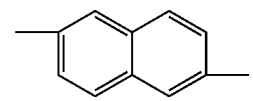

[Chemical Formula 5]

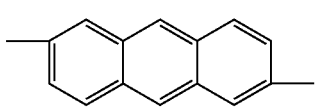

[Chemical Formula 6]

A method of manufacturing an LCD device according to another aspect of the embodiment of the present disclosure includes: providing a first substrate; providing a second substrate which is disposed to face the first substrate; forming an alignment layer, including a chemical composition indicated by Chemical Formula 1, on an inner surface of at least one of the first and second substrates; and forming a liquid crystal layer between the first and second substrates,

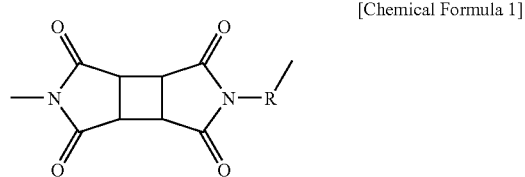

[Chemical Formula 1]

wherein "R" is an aromatic based chemical compound.

The forming of the alignment layer includes: forming an alignment precursor film by coating a material, including the chemical composition, on the inner surface of at least one of the first and second substrates; irradiating light to the alignment precursor film to form the alignment layer; and performing a crosslinking process to the alignment layer.

In addition, to prevent the increase of viscosity, the alignment composition may further include a chemical compound indicated by the following Chemical Formula 7,

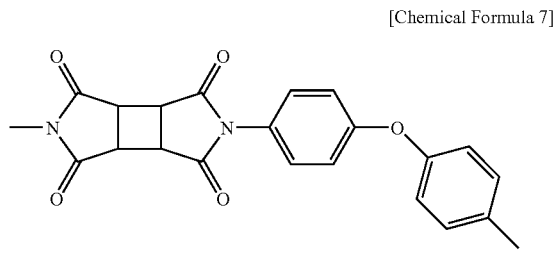

[Chemical Formula 7]

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
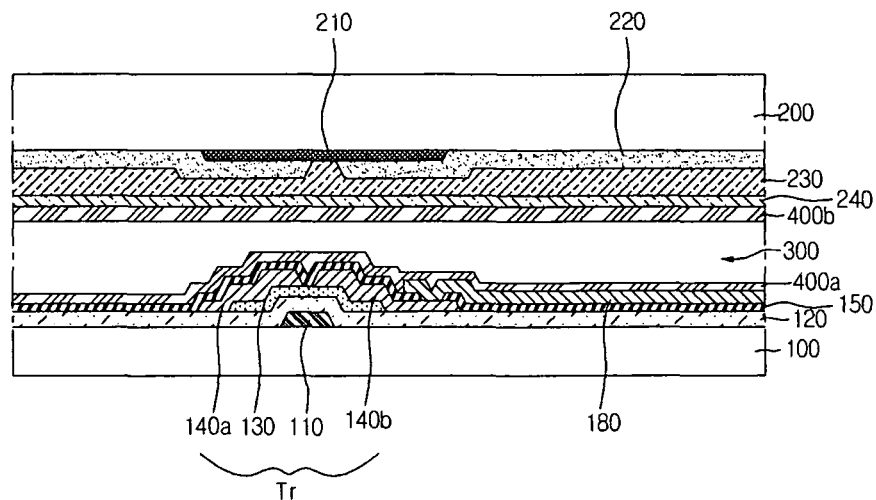
FIG. 1 is a cross-sectional view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

FIG. 1 is a cross-sectional view showing an LCD device according to an embodiment of the present disclosure. Referring to FIG. 1, an LCD device includes a first substrate 100, a second substrate 200 disposed to face the first substrate 100, a liquid crystal layer 300 interposed between the first and second substrates 100 and 200, and first and second alignment layers 400a and 400b each disposed on the inner surfaces of the first and second surfaces 100 and 200. Only one of the first and second alignment layers 400a and 400b can be disposed.

In detail, a plurality of pixels are arranged on the first substrate 100 to display an image. The pixels can be defined by gate wiring and data wiring (not shown), crossing each other on the first substrate 100. A thin film transistor (TFT) Tr electrically connected to the gate wiring and the data wiring is disposed at each pixel. The TFT Tr includes: a gate electrode 110 branched from the gate wiring; a gate insulation layer 120 covering the gate electrode 110; a semiconductor pattern 130 disposed on the gate insulation layer 120, in opposition to the gate electrode 110; a source electrode 140a disposed on the semiconductor pattern 130; and a drain electrode 140b, separative from the source electrode 140a, disposed on the semiconductor pattern 130.

A passivation layer (or a protection layer) 150 covering the TFT Tr is disposed on the first substrate 100. A pixel electrode 180 electrically connected to the drain electrode 140b is disposed on the passivation layer 150. The first alignment layer 400a is formed on the overall surface of the first substrate 100 including the pixel electrode 180. The first alignment layer 180 has a function that aligns the liquid crystal molecules constituting the liquid crystal layer 300 in a particular direction.

The first alignment layer 400a may be formed of a chemical composition indicated by Chemical Formula 1.

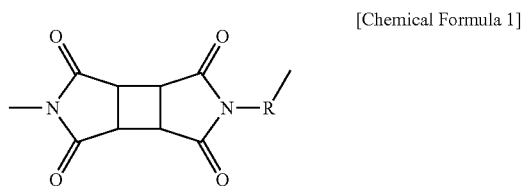

[Chemical Formula 1]

In Chemical Formula 1, "R" may be an aromatic based chemical compound. For example, the aromatic based chemical compound may include one of chemical substances which are indicated by the following Chemical Formulae 2-6.

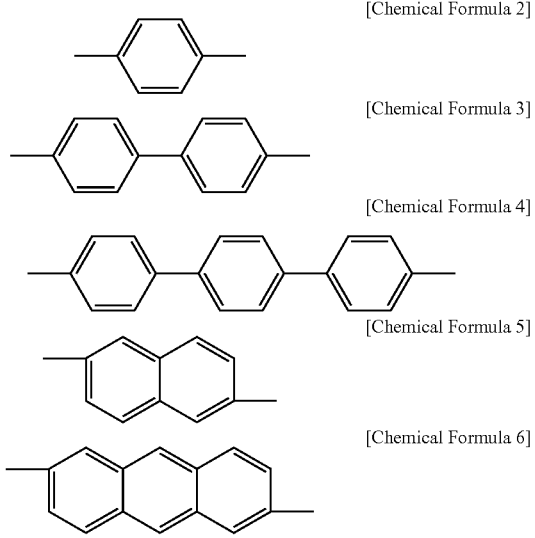

[Chemical Formula 2]

[Chemical Formula 3]

[Chemical Formula 4]

[Chemical Formula 5]

[Chemical Formula 6]

When light is irradiated to the chemical composition indicated by Chemical Formula 1, the chemical composition is decomposed into a cyclobutane imide ring-based compound having a maleimide group and a byproduct thereof in order to have anisotropy for alignment of liquid crystal. The byproduct has no influence on the alignment of liquid crystal and may be an optical oxidant. The byproduct may deteriorate thermalization of the first alignment layer 400a. To address this problem, the byproduct may be crosslinked in a process of forming the first alignment layer 400a and a thermal treatment process. In addition, the cyclobutane imide ring and the byproduct may have the aromatic compound R. That is, the byproduct of the first alignment layer 400a is crosslinked. Also, as the chemical composition included in the first alignment layer 400a has an aromatic compound, the glass transition temperature of the first alignment layer 400a may be improved. Accordingly, the thermalization of the first alignment layer 400a is improved and finally the residual image problem of the first alignment layer 400a can be solved.

A color filter pattern 220 used to embody colors is disposed on an inner surface of the second substrate 200. In detail, a black matrix 210 to prevent light leakage is disposed on the inner surface of the second substrate 200. An opening to expose the pixel to display an image is formed in the black matrix 210. The color filter pattern 220 is disposed in the opening, that is, in the pixel. An overcoat layer 230 may be further disposed on the overall surface of the second substrate 200 including the black matrix 210 and the color filter pattern 220. The overcoat layer 230 has a flat upper surface so that a step formed by the black matrix 210 and the color filter pattern 220 can be removed.

A common electrode 240 is disposed on the overcoat layer 230. Liquid crystal molecules of the liquid crystal layer 300 are driven by an electric field formed between the common electrode 240 and the pixel electrode 180. The second alignment layer 400b facing the first alignment layer 400a may be further disposed on the common electrode 240. The second alignment layer 400b may be formed of the same material as the first alignment layer 400a.

Figure 2A:
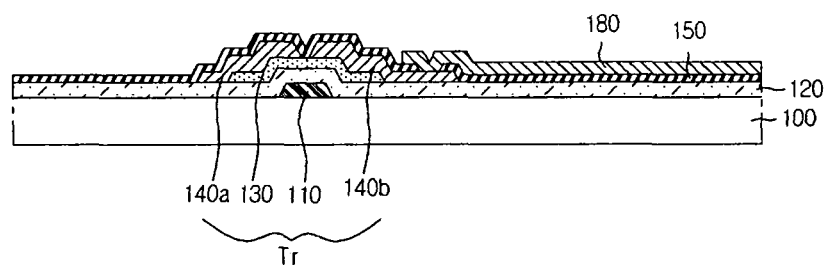
FIGS. 2A~2D are cross-sectional views for explaining a method of manufacturing an LCD device according to an embodiment of the present disclosure.

FIGS. 2A-2D are cross-sectional views for explaining a method of manufacturing the LCD device of FIG. 1 according to an embodiment of the present disclosure. Referring to FIG. 2A, to manufacture an LCD device according to an embodiment of the present disclosure, the gate wiring and the data wiring crossing each other and the TFT Tr are formed on the first substrate 100 where the pixels are defined, at each point where the gate wiring and the data wiring cross each other. The TFT Tr includes: the gate electrode 110 branched from the gate wiring; the gate insulating layer 120 covering the gate electrode 110; the semiconductor pattern 130 disposed on the gate insulating layer 120 and opposed to the gate electrode 110; the source electrode 140a disposed on the semiconductor pattern 130; and the drain electrode 140b, separative from the source electrode 140a, disposed on the semiconductor pattern 130.

The passivation layer 150 is formed on the first substrate including the TFT Tr. The passivation layer 150 may be formed of an organic layer, an inorganic layer, and a stacked layer thereof. When the passivation layer 150 is formed of the organic layer, the passivation layer 150 may be formed in a slit coating method, a spray coating method, or a spin coating method. When the passivation layer 150 is formed of the inorganic layer, the passivation layer 150 may be formed in a chemical vapor deposition method.

The pixel electrode 180 electrically connected to the drain electrode 140b is formed on the passivation layer 150. To form pixel electrode 180, a transparent conductive layer is formed on the passivation layer 150. The transparent layer may be formed through a deposition method. The material of the transparent conductive layer may be ITO or IZO. The first electrode 180 may be formed by etching the transparent conductive layer.

Figure 2B:
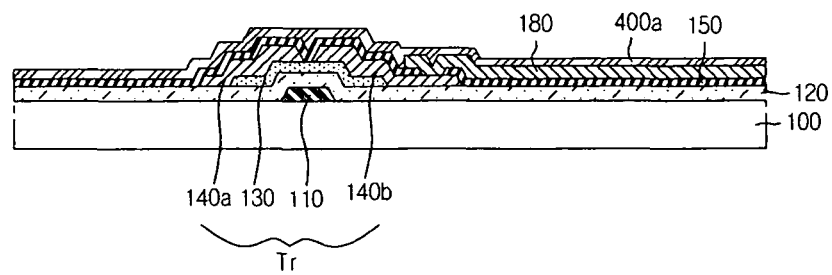

Referring to FIG. 2B, the first alignment layer 400a is formed on the first substrate 100 including the first electrode 180. To form the first alignment layer 400a, an alignment precursor film is formed by coating an alignment composition including the chemical compound indicated by Chemical Formula 1.

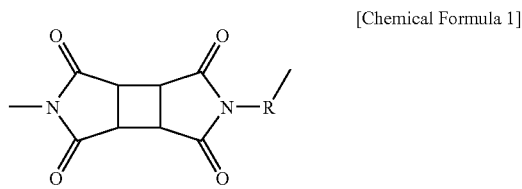

[Chemical Formula 1]

In Chemical Formula 1, "R" may be an aromatic based chemical compound. For example, the aromatic based chemical compound can include one of chemical substances which are indicated by the following Chemical Formulae 2-6.

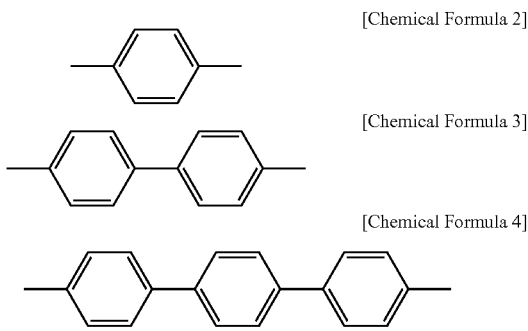

[Chemical Formula 2]

[Chemical Formula 3]

[Chemical Formula 4]

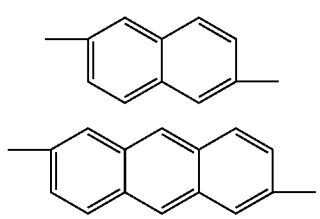

[Chemical Formula 5]

[Chemical Formula 6]

The alignment precursor film may be formed in a slit coating method, a spin coating method, or a spray coating method.

The first alignment layer 400a may be formed by irradiating light to the alignment precursor film. The light may be a polarized ultraviolet ray or an unpolarized ultraviolet ray. A light source to emit the light may be a high pressure mercury lamp or xenon lamp. The intensity of the light may be 0.5-10 J/cm². When the intensity of the light is about 1 J/cm², the chemical composition indicated by Chemical Formula 1 may be sufficiently decomposed.

When the light is irradiated to the chemical composition indicated by Chemical Formula 1, the chemical composition may be decomposed as shown in the following Reaction Formula 1.

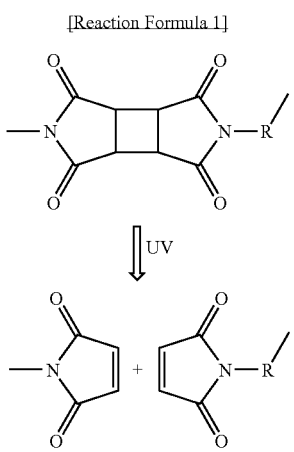

[Reaction Formula 1]

In Reaction Formula 1, the chemical composition indicated by Chemical Formula 1 may be decomposed to a cyclobutane imide ring-based compound having a maleimide group and a byproduct thereof to have anisotropy.

The process of irradiating the light may be performed in a nitrogen atmosphere to prevent oxidation of a carbonyl group during the process of decomposing the chemical composition indicated by Chemical Formula 1. Accordingly, the problem where a residual image is generated due to the oxidation of the carbonyl group may be prevented.

The byproduct has a maleimide group and an aromatic compound so that its heat resistance can be improved. The byproduct has no influence on the alignment of liquid crystal.

However, when thermal stress is continuously applied to the first alignment layer 400a, the byproduct is recombined to the cyclobutane imide ring -based compound or the first alignment layer 400a may be deformed.

To address this problem, the byproduct is crosslinked by performing a thermal treatment process to the first substrate 100 including the first alignment layer 400a. The byproduct is crosslinked in a process of curing the maleimide group so that the byproduct reaction is no longer generated. Accordingly, the residual image problem can be solved by preventing the deformation of the first alignment layer 400a. Also, as the glass transition temperature of the first alignment layer 400a improves, the mobility of the first alignment layer 400a due to heat decreases. That is, the thermal stability of the first alignment layer 400a can be improved.

In addition, to control the increase in viscosity, the alignment composition may further include a maleimide based compound including an ether group, for example, a chemical compound indicated by the following Chemical Formula 7.

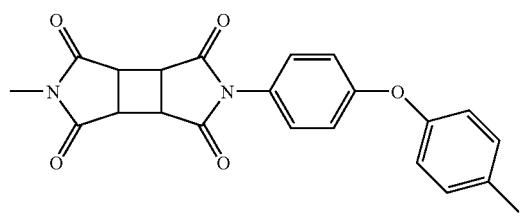

[Chemical Formula 7]

The range of the thermal treatment temperature may be about 100-300° C. When the thermal treatment temperature is less than 100° C., the process of crosslinking the first alignment layer 400a may not be performed. When the thermal treatment temperature exceeds 400° C., thermal decomposition of the first alignment layer 400a may be generated.

The crosslinking process may be performed in a nitrogen atmosphere to prevent a side reaction. In addition, the alignment and crosslinking processes may be performed in the same chamber or in different chambers.

Figure 2C:
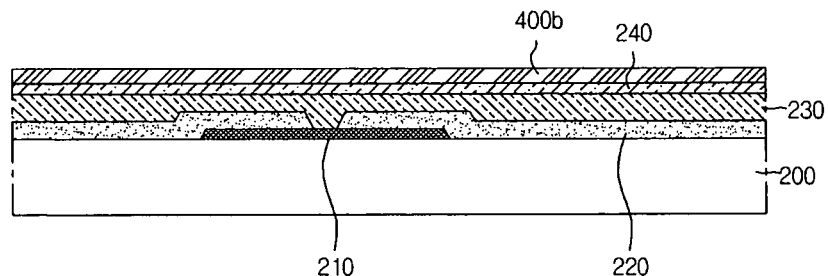

Referring to FIG. 2C, the second substrate 200 is provided independently of the forming of the TFT Tr on the first substrate 100. The black matrix 210 having a plurality of openings is formed on the second substrate 200. That is, the black matrix 210 is disposed on the second substrate 200 corresponding to the gate wiring, the data wiring, and the TFT of the first substrate 100.

The black matrix 210 may be formed by forming a black resin layer on the second substrate 200 and exposing and developing it. When the black matrix 210 is formed of an inorganic substance such as chromium, the black matrix 210 may be provided through an etching process using photoresist.

The color filter pattern 220 is formed in the opening. To form the color filter pattern 220, a color filter resin layer is formed on the second substrate 200 including the black matrix 210 and then the exposure and development processes are performed to form the color filter pattern 220.

The overcoat layer 230 is formed on the second substrate 200 including the black matrix 210 and the color filter pattern 220. The common electrode 240 is formed on the overcoat layer 230. The common electrode 240 may be formed of a transparent conductive layer, for example, ITO or IZO.

The second alignment layer 400b may be further formed on the common electrode 240. The second alignment layer 400b may be formed in the same method as that used for the first alignment layer 400a.

Figure 2D:
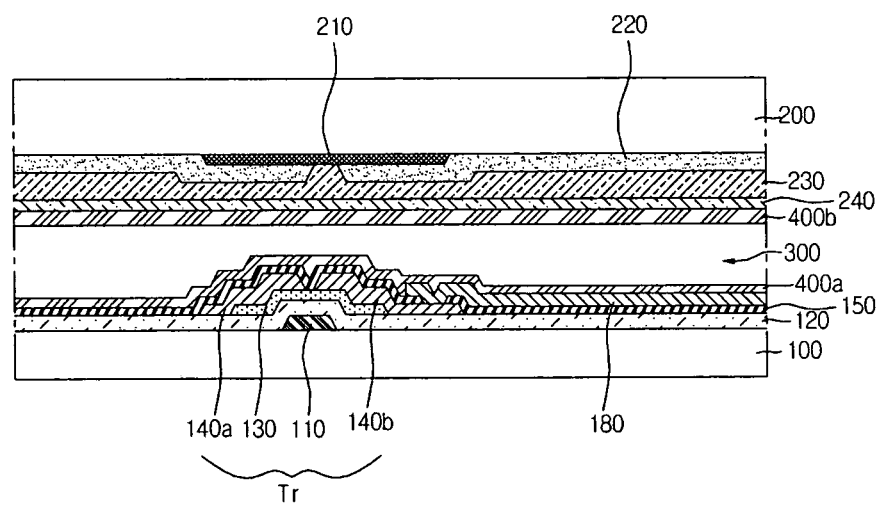

Referring to FIG. 2D, a sealing member (not shown) is formed along edges of the first and second substrates 100 and 200. After liquid crystal is dropped on the first and second substrates 100 and 200, they are combined by using the sealing member. Although, in the present embodiment, the liquid crystal layer is formed in a one drop filling method, is not limited thereto. That is, the liquid crystal layer may be formed through a liquid crystal injection method.

The variation in the characteristic of the alignment layer according to the crosslinking process is observed and described below.

To measure a change in residual image before and after the alignment layer crosslinking process, first and second LCD devices A1 and A2 and third and fourth LCD devices B1 and B2 are manufactured with reference to the method according to the second embodiment of the present disclosure. Alignment layers of the first and second LCD devices A1 and A2 each are formed from a chemical composition indicated by the following Chemical Formula 8. The alignment layer of the second LCD device A2 undergoes the crosslinking process while the alignment layer of the second LCD device A2 does not.

Also, alignment layers of the third and fourth LCD devices B1 and B2 each are formed from a chemical composition indicated by the following Chemical Formula 9. The alignment layer of the fourth LCD device B2 undergoes the crosslinking process while the alignment layer of the third LCD device B1 does not undergo the crosslinking process. The crosslinking process is performed by using a thermal process at a temperature of 230° C.

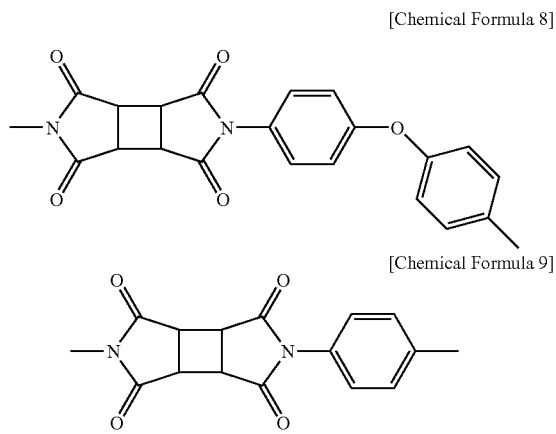

[Chemical Formula 8]

[Chemical Formula 9]

Figure 3:
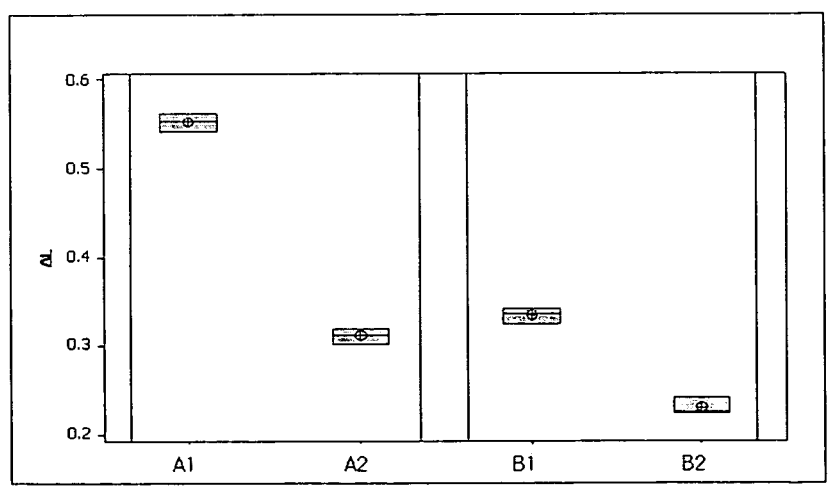
FIG. 3 is a graph showing a result of measurement of a residual image due to the crosslinking process of an alignment layer.

FIG. 3 is a graph showing a resulting measurement of a residual image according to the existence of a crosslinking process of an alignment layer. Referring to FIG. 3, the residual image of the second LCD device A2 is improved compared to the first LCD device A1. Also, the residual image of the fourth LCD device B2 is improved in comparison to the third LCD device B1. As a result, it is evident that the residual image is improved by the crosslinking process. In addition, it is evident that the residual image of the fourth LCD device B2 is improved in comparison to the second LCD device A2.

Figure 4:
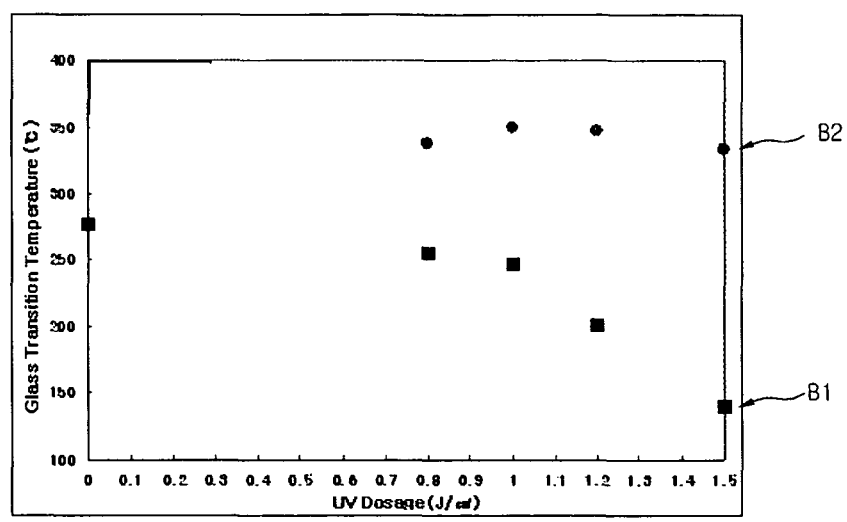
FIG. 4 is a graph showing a variation in the glass transition temperature of the alignment layer according to the UV irradiation energy.

FIG. 4 is a graph showing a change in the glass transition temperature of the alignment layer according to the UV irradiation energy in the third and fourth LCD devices. Referring to FIG. 4, it can be seen that in the third LCD device B1, the glass transition temperature decreases as the UV irradiation energy increases. Also, it can be seen that in the fourth LCD device B2, the glass transition temperature remains constant even when the UV irradiation energy increases.

Thus, since the alignment layer according to the present embodiment has an aromatic based chemical compound and the crosslinking process is further performed while forming the alignment layer, the glass transition temperature and the thermalization of the alignment layer is improved and the residual image problem is solved.

As described above, in the LCD device according to an embodiment of the present disclosure, the contamination of the surface of the alignment layer and the generation of static electricity can be prevented, since the alignment layer is formed in a non-contact method such as the photodegradation method using the irradiation of light. Also, since the alignment layer has an aromatic compound and a process of crosslinking a byproduct formed after the photodegradation is added, the glass transition temperature and the thermalization of the alignment layer is improved and the residual image problem is solved.

It will be apparent to those skilled in the art that various modifications and variations can be made in the present disclosure. Thus, it is intended that the present disclosure cover the modifications and variations of this embodiment provided they come within the scope of the appended claims and their equivalents.

What is claimed is:

1. A liquid crystal display device comprising:
   a first substrate;
   a second substrate disposed to face the first substrate;
   a liquid crystal layer interposed between the first and second substrates; and
   an alignment layer disposed on an inner surface of at least one of the first and second substrates and formed of an alignment composition comprising a chemical compound represented by Chemical Formula 1,

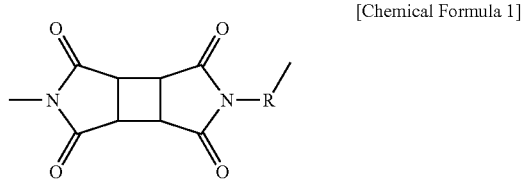

[Chemical Formula 1]

wherein R is an aromatic-based chemical compound,
wherein the alignment composition further comprises a maleimide-based compound containing an ether group,
wherein Chemical Formula 1 is decomposed to a cyclobutane imide ring-based compound and a byproduct in a process of irradiating light in a nitrogen atmosphere,
wherein a residual image generated due to the oxidation of the carbonyl group is prevented,
wherein the cyclobutane imide ring-based compound has anisotropy for alignment of liquid crystal,
wherein the byproduct has a maleimide group and an aromatic compound,
wherein the byproduct has no influence on the alignment of liquid crystal,
wherein the byproduct is crosslinked by a thermal treatment in a nitrogen atmosphere at a temperature of about 100° C. to 300° C. to prevent recombination of the byproduct with the cyclobutane imide ring-based compound, and
wherein a glass transition temperature of the alignment layer remains substantially constant within the range of 300° C. and 400° C. when the range of the UV dosage energy is 0.8 J/cm$^2$ and 1.5 J/cm$^2$.

2. The liquid crystal display device claimed as claim 1, wherein the aromatic-based chemical compound includes a compound represented by any one of Chemical Formulae 2 to 6 described below,

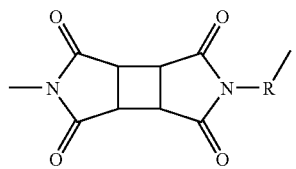

[Chemical Formula 1]

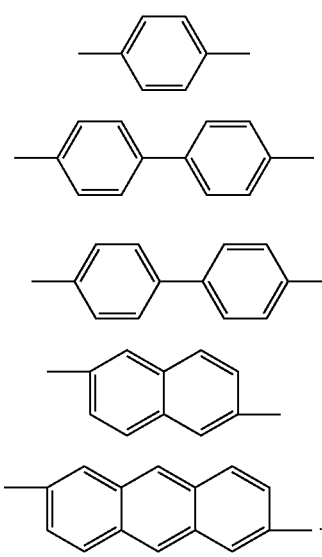

[Chemical Formula 2]

[Chemical Formula 3]

[Chemical Formula 4]

[Chemical Formula 5]

[Chemical Formula 6]

wherein R is an aromatic based chemical compound,
wherein the forming of the alignment layer comprises:
forming an alignment precursor film by coating the alignment composition on at least one of the inner surfaces of the first and second substrates;
irradiating light to the alignment precursor film to form the alignment layer and decomposing the chemical compound represented by Chemical Formula 1 to a cyclobutane imide ring-based compound and a byproduct; and
applying a thermal treatment at a temperature of about 100° C. to 300° C. to the alignment layer in a nitrogen atmosphere,
wherein the cyclobutane imide ring-based compound has anisotropy for alignment of liquid crystal,
wherein crosslinking of the byproduct occurs during the thermal treatment,
wherein the irradiating of light is performed in a nitrogen atmosphere to prevent oxidation of a carbonyl group during the process of decomposing the chemical compound indicated by Chemical Formula 1,
wherein a residual image generated due to the oxidation of the carbonyl group is prevented,
wherein the irradiating and crosslinking occur in the same chamber, and
wherein a glass transition temperature of the alignment layer remains substantially constant within the range of 300° C. and 400° C. when the range of the UV dosage energy is 0.8 J/cm$^2$ and 1.5 Jcm$^2$.

3. A method of manufacturing a liquid crystal display device, the method comprising:
providing a first substrate;
providing a second substrate that is disposed to face the first substrate;
forming an alignment layer on an inner surface of at least one of the first and second substrates; and
forming a liquid crystal layer between the first and second substrates,
wherein the alignment layer is formed of an alignment composition comprising a chemical compound represented by Chemical Formula 1 and a maleimide-based compound containing an ether group,

* * * * *